United States Patent [19]

Singer et al.

[11] Patent Number: 5,485,163
[45] Date of Patent: Jan. 16, 1996

[54] PERSONAL LOCATOR SYSTEM

[75] Inventors: Martin H. Singer, Northbrook; Daniel Tell, Deerfield; Anthony Kobrinetz, Hoffman Estates, all of Ill.

[73] Assignee: Motorola, Inc., Schaumburg, Ill.

[21] Appl. No.: 220,342

[22] Filed: Mar. 30, 1994

[51] Int. Cl.⁶ ............................................. G01S 3/02
[52] U.S. Cl. ................................... 342/457; 342/419
[58] Field of Search .................................. 342/457, 419; 379/59

[56] References Cited

U.S. PATENT DOCUMENTS

| | | |
|---|---|---|
| 3,787,862 | 1/1974 | Jacobson . |
| 3,806,937 | 4/1974 | Lindley . |
| 3,872,477 | 3/1975 | King . |
| 3,984,807 | 10/1976 | Haemmig . |
| 4,215,345 | 7/1980 | MacDoran . |
| 4,229,620 | 10/1980 | Schaible . |
| 4,728,959 | 3/1988 | Maloney et al. . |
| 4,888,593 | 12/1989 | Friedman et al. . |
| 4,899,135 | 2/1990 | Ghahariiran . |
| 5,017,926 | 5/1991 | Ames et al. . |
| 5,021,794 | 6/1991 | Lawrence . |
| 5,099,248 | 3/1992 | Brommer . |
| 5,128,925 | 7/1992 | Dornstetter et al. . |
| 5,146,231 | 9/1992 | Ghaem et al. . |
| 5,173,709 | 12/1992 | Lauro et al. . |
| 5,208,756 | 5/1993 | Song ........................ 364/449 |
| 5,218,367 | 6/1993 | Sheffer et al. . |
| 5,218,716 | 6/1993 | Comroe et al. . |
| 5,247,698 | 9/1993 | Sawyer et al. . |
| 5,247,700 | 9/1993 | Wohl et al. . |
| 5,317,323 | 5/1994 | Kennedy et al. . |
| 5,398,190 | 3/1995 | Wortham ................ 364/460 |
| 5,404,376 | 4/1995 | Dent . |
| 5,418,537 | 5/1995 | Bird ....................... 342/357 |

FOREIGN PATENT DOCUMENTS 3-239091  10/1991  Japan .

*Primary Examiner*—Theodore M. Blum
*Attorney, Agent, or Firm*—Jeffrey G. Toler; Kevin A. Buford

[57] ABSTRACT

A system and method for locating a portable locator device in a communications network. The portable locator unit (PLU) (4) is activated either by an external signal (62) generated in response to remote activation source, such as a subscriber (6, 8) or PLU detector (106, 108), or by an internal activation signal triggered e.g. by the wearer. Once activated, the PLU (4) transmits a location signal (66). This location signal (66) is received by one or more network service nodes (20, 22, 24) which forward the information along with identifying service node information to a network location processor (26, 28). After having determined the location of the PLU (4) from the received information, the network location processor (26, 28) forwards this information to a designated source, such as the requesting subscriber or other authorized user (6, 8).

38 Claims, 4 Drawing Sheets

PERSONAL LOCATOR SYSTEM

FIELD OF THE INVENTION

This invention relates to a system for locating persons or objects, and in particular a wireless communication system for use in locating and tracking persons and/or objects.

BACKGROUND OF THE INVENTION

Today's news numbs us with accounts of kidnapping and theft. Even the most hardened cynics are haunted by the stories of child abductions: a stranger dragging a child from her home, adolescents taking a screaming toddler from a shopping mall, infants kidnapped from a hospital. Constant vigilance, and fear, have become all to common place for parent and child alike.

Those solutions that have been offered in the past are of limited effectiveness, or as a practical matter unavailable to the average person. Child monitoring devices, such as described in U.S. Pat. No. 4,899,135, have a limited range, and once a child is beyond that range provides no means for relocating the child. Emergency locator systems, such as shown in U.S. Pat. No. 5,021,794, provide a means for homing in on a child from a greater range, but also require the additional assistance of mobile homing units and remain ineffective beyond a still limited broadcasting range of the homing beacon.

While there are technologies offering better location methods, these remain mostly out of reach of the average person due to the cost prohibitive nature of the solution. Thus, while RF tags installed on vehicles permit the location of stolen automobiles, the transmitters for such tags require high power sources (car batteries), are relatively expensive (currently over five hundred dollars), and require the intervention of local police with additional hardware and software (at more expense) for tracking the car. Emergency systems, such as that described in U.S. Pat. No. 5,218,367, represent similarly expensive solutions, relying upon an on board emergency activation circuitry and a high power source for the continuous multicell control signal scan and the response transmissions thereto. Likewise, any system incorporating a GPS (Global Positioning System) receiver will, although providing accurate location information, add undesirable bulk and several hundred dollars expense to the locator device.

Any solution to this need for inexpensive locator devices should also be balanced against the right to privacy in our own personal affairs. Safeguards must exist against unwanted third party (listening) in on others' locations. Thus, while any effective solution will provide an inexpensive locating system, it should also include subsystems to ensure that only those persons authorized to follow the movements of a locator device will in fact have access to the location information.

Finally, it is also desirable that any such solution provide the location information without requiring the intervention of our already overtaxed emergency services, except where necessary.

SUMMARY OF THE INVENTION

These needs and others are substantially met by the system and method disclosed herein for locating a portable locator device in a communications network. The portable locator unit (PLU) is activated either by an external signal generated at a remote activation source, such as a subscriber or PLU detector, or by an internal activation signal triggered e.g. by the wearer. Once activated, the PLU transmits a location signal. This location signal is received by one or more network service nodes which forward the information along with identifying service node information to a network location processor. After having determined the location of the PLU from the received information, the network location processor forwards this information to a designated source, such as the requesting subscriber or other authorized user.

DESCRIPTION OF A PREFERRED EMBODIMENT

Figure 1:
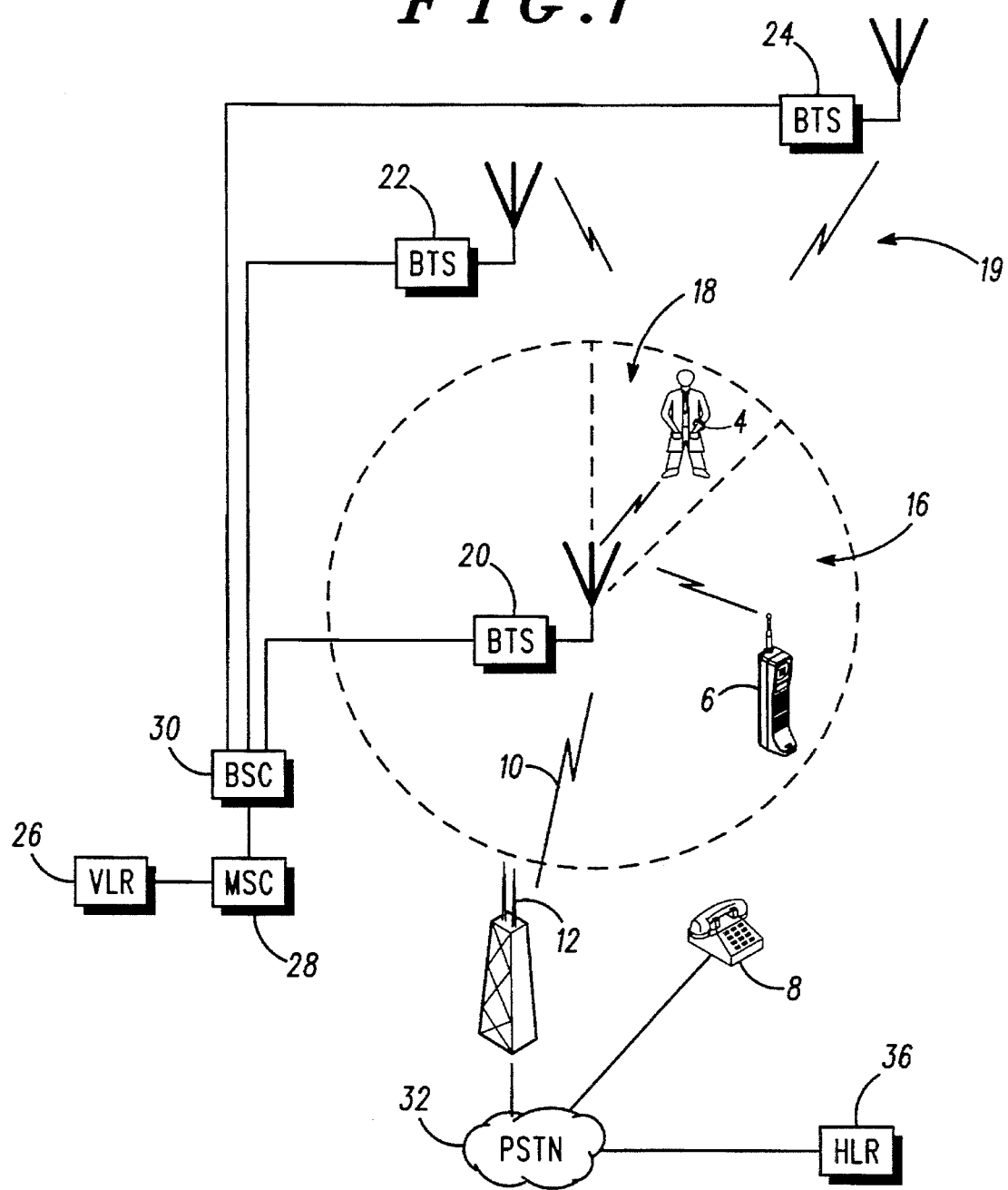
FIG. 1 illustrates a communications network in accordance with the present invention.

The present invention provides a unique solution to the problems discussed above by using a low power and inexpensive portable locator unit (PLU) in conjunction with a communications system having wireless service nodes to allow a subscriber to locate the PLU. FIG. 1 illustrates one such communications network. In this case the portable locator unit (PLU) 4 is attached to a lost or abducted child, and has the form of a tag, an ornamental bracelet, or the like. While the PLU has been illustrated taking this specific form, with appropriate miniaturization it could be incorporated in almost any object, such as a belt, watch, earring, etc. The PLU includes a low power source, a transceiver, a memory for storing instructions and other information (such as the PLU identification) necessary for the operation of the unit, and an antenna (not shown). It is preferred, in order to conserve power, that the PLU be in receive only mode until activated for location purposes.

Following activation of PLU 4, the location of PLU 4 is determined using one or more service nodes of a communications network. These nodes are illustrated in FIG. 1 as base transceiving stations (BTS) 20, 22, and 24 of a communications network including a cellular telephony infrastructure. The network is not limited to a cellular system, and in some regions may not even include any cellular service nodes. Thus, the service nodes may be part of such differing systems as a trunked radio, satellite, or personal communicator service (PCS) system, and it is expected that an integrated network will include all these and more. The only requirement is that the network include service nodes capable of wireless communication with the PLU.

In networks having sufficiently small nodes, such as microcellular networks, the location of PLU 4 may be determined with sufficient precision solely based upon its location within the coverage area 16 of one such node 20. In larger cells having sector antennas, the approximate location of PLU 4 may be determined based on the coverage area 18 of the receiving sector transceiver. However, in cells larger than microcells, and where more than an approximate location is desired, one or more additional steps in determining the location of PLU 4 may be used, as discussed below in connection with FIG. 3.

Where BTS 20 is a microcellular node, the location information forwarded from BTS 20 to base station controller (BSC) 30 may be as simple as a signal containing an identifier like the mobile ID number (MIN) of PLU 4 and a node ID number (NIN) for BTS 20. BSC 30 may alternatively be a cellular or wireless application processor (C/WAP) connecting directly to the Public Switched Telephone Network (PSTN) 32 via a telephone switch (not shown). BSC 30 is connected to mobile service switching center (MSC) 28. Attached to MSC 28 is a location register. The location register handles both visiting as well as home location functions, depending on whether a PLU is registered with its home location in MSC 28 or elsewhere.

In the illustrated embodiment a visiting location register (VLR) 26 is attached to MSC 28. The home location register (HLR) 36 for PLU 4 can be directly coupled to PSTN 32 or coupled via one or more MSCs. While it is not essential that a VLR 26 be utilized, it is preferable in view of factors such as the multiple operators likely to be functioning within the communications network. For example, by utilizing information stored within its local VLR 26, one operator can identify the geographic location of BTS 20, or even subregions such as sector coverage area 18, based on the identifying information forwarded from BTS 20. This geographic information, as well as the MIN of PLU 4 and the time of receipt, may then be forwarded to the HLR 36 via the MSC 28 and PSTN 32. This simplifies the amount of information that would otherwise be required to be retained at each location register throughout the network, and in some instances such information (such as that identifying sector coverage areas) may not as a practical matter be available to a location register of a competing operator or operators of different types of systems.

Finally, each HLR preferably contains subscriber preference information directing how the PLU location information is to be communicated. Such preferences may include the means by which the information is to be communicated, e.g., by data or voice over wireline or wireless (paging or cellular) systems to a specified end system or receiving device (e.g., cellular phone), and the desired forgnat (e.g., geographical location, proximate place names (buildings), relative position and the like).

One skilled in the art will also recognize that significant extra features will be available for PLUs equipped and operating within advanced operator systems such as NAMPS (Narrowband Advanced Mobile Phone Service). By use of extended protocol messages, PLUs can register without interfering with regular mobile registrations. They can also be sent instructions (e.g. to "register" at set intervals or tune to a channel) without the PLU using uplink resources. Further, a mobile tracker (6) can be sent location updates as data signals on the control channel, without the need for being assigned a traffic channel.

Figure 2:
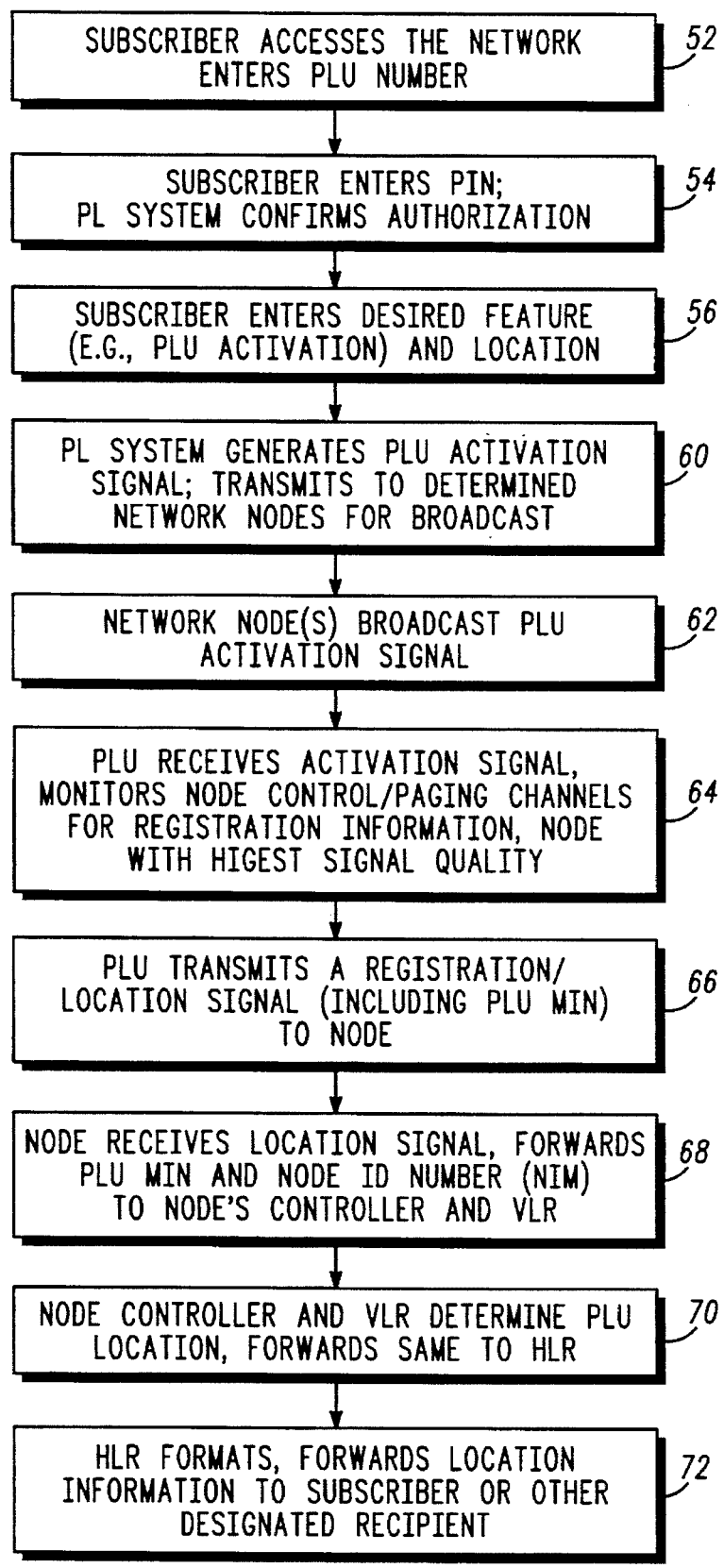
FIG. 2 illustrates a flowchart of steps for locating a PLU using a first embodiment of the present invention.

Turning now to FIG. 2 one embodiment for implementing the invention in a network including a cellular system is illustrated. The location service is initiated in this embodiment by a request from a subscriber. This request may be initiated by dialing an assigned number for the PLU. When dialing into a PSTN directly from a fixed station such as telephone 8 of FIG. 1, the number for PLU 4 may need to be preceded by an appropriate system access number. When accessing the system from a wireless environment, such as from mobile unit 6 of FIG. 1, appropriate system protocols may be used, such as adding a suffix to the PLU number identifying the call as a location request for a PLU. Once the call has been connected, the subscriber is prompted to enter a PIN assigned for the location services for PLU 4. Upon confirmation of the PIN, the subscriber may be prompted to enter the form of services desired (if not already identified by a protocol), e.g., location, maintenance or the like.

Following a request for the location of PLU 4, service parameters regarding PLU 4 are read from HLR 36 and used for activation of PLU 4. Thus, where PLU 4 is set up to be activated, e.g., by an area wide page command, an activation command is forwarded to the paging system for broadcast from a paging antenna (12) as a page message (signal 10) to PLU 4. On the other hand, where PLU 4 is only set up to transmit and receive over cellular telephony bands, an activation command will be forwarded throughout the participating cellular operating systems of the network to be transmitted from each BTS. In order to conserve system resources, one skilled in the art will appreciate that appropriate algorithms may be employed to search for PLU 4, starting for example either at the cells in proximity to the HLR 36 or proximate some other location designated by the subscriber as the last known location of PLU 4.

Upon receipt of the activation signal, PLU 4 switches from receive only mode to receive and transmit mode. In this mode, PLU 4 monitors the paging or control channels of local BTSs to determine the transmission channels being used by the BTSs. PLU 4 then registers with the strongest BTS, transmitting a location signal (LS) that includes the PLU's MIN. This information is forwarded, along with the node identification number (NIN) of receiving BTS 20, to the VLR 26 via BSC 30. VLR 26 translates the NIN, or other received location identifying information from BTS 20 via a lookup table to determine the approximate geographic location of PLU 4. This location information, along with the time of receipt, is then forwarded to HLR 36 using the MIN address information.

Finally, upon receipt of the location information at HLR 36, the location information is forwarded, in the requested format (stored in the PLU service parameters, which include subscriber preferences), to the subscriber. Thus, if the subscriber is operating a mobile unit 6, the location information can be forwarded in a format applicable to the mobile unit. Where mobile unit 6 is an alphanumeric pager, the information can be displayed upon a pager display. On the other hand, where mobile unit 6 is a cellular telephone, the information can be forwarded in a voice format. Further, where mobile unit 6 is also being tracked (e.g. by appropriate request to have its location also stored at HLR 36), information can be calculated and forwarded giving the approximate relative position (i.e. distance and direction) of PLU 4 to mobile unit 6.

In the foregoing embodiment, it is envisioned that the system will continuously update the location information of PLU 4 until such time as the subscriber again accesses the system to request an end of the search. For operation in cellular environments, information is updated by PLU 4 monitoring the cellular control channels and re-registering each time it moves into a new cell coverage area (such as coverage area 19 of BTS 24 in FIG. 1). One skilled in the art, however, will recognize that there are various methods that may be used in updating the system information, and the appropriate method to be used will depend upon factors such as operating system configurations and the time criticality of the location information. Thus, it is also possible to update the location information by such methods as: resending a paging command so as to force PLU 4 to re-register; including an extended protocol command along with the activation command to command the PLU to send location signals at predetermined intervals; or even commanding PLU 4 to continuously transmit on a dedicated channel so as to provide a proximity homing beacon.

Figure 3:
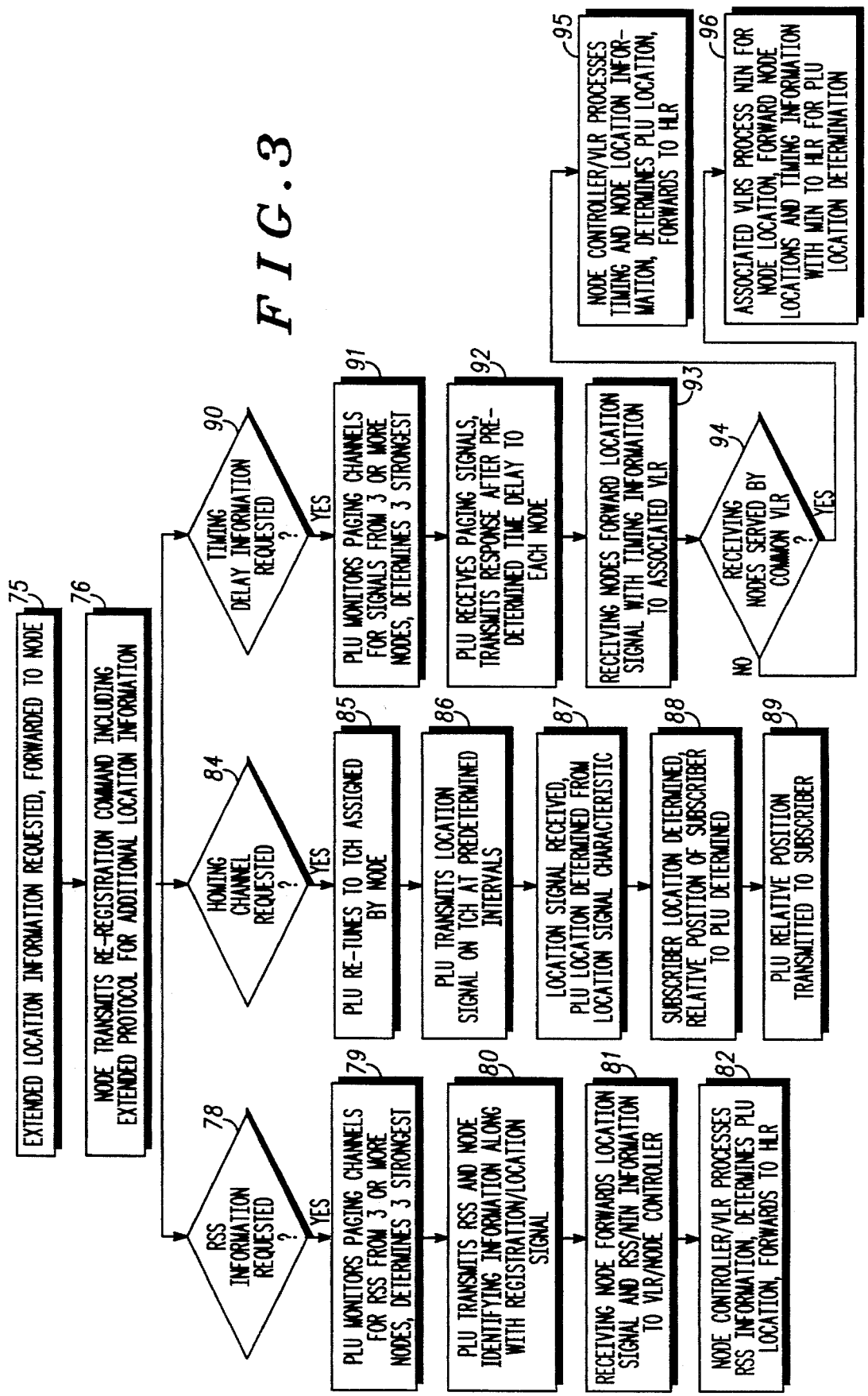
FIG. 3 is a flowchart of further steps that may be used in determining and communicating the location of the PLU in accordance with another embodiment of the present invention.

In addition to using cell or sector location information, the system of the invention may be implemented so as to provide more precise location information. FIG. 3 illustrates one such implementation; those skilled in the art will recognize that other refinements and approaches may be used, based upon the specific operating system (i.e., cellular, PCS, trunk radio, in-building, etc.) in which the PLU is communicating. The embodiment of FIG. 3 is particularly useful for locating PLUs within large cell systems, such as the AMPS cellular telephone system. In such systems, the location of a PLU within a cell may not provide sufficient information, since the cell may encompass several square miles of territory. Consequently, use of neighboring transceivers, such as BTSs 22 and 24 of FIG. 1, may be advantageously used. In an appropriately programmed system, upon request for more precise location information, a registration command may be sent across the control channel BTS 20 to PLU 4, including an additional protocol command designating the additional information desired. In response to one such command, PLU 4 monitors and forwards received signal strength information regarding the control channel signals from BTS 20 and the two or more next strongest channels (e.g., from BTS 22 and 24). The received signal strength information and ID's of the respective BTSs are then forwarded to BSC 30 and VLR 26 for appropriate determination of the location, based upon an appropriate algorithm and/or stored information (such as prior readings). Rather than relying upon a separate command, it will be appreciated that such RSSI (received signal strength indication) information can be included with each registration when operating in an appropriately configured registration system.

Similarly, timing delay and phase information may be used to more precisely locate a PLU. This may be accomplished by transmitting a protocol command to PLU 4 to register with two or more node transceivers, e.g., BTS 20, 22, and 24. When the location is based upon timing advance, PLU 4 will delay each received registration command (including node identification) from the respective BTSs by a predetermined amount of time, and then respond with a registration signal (or return echo). Each receiving BTS will forward information regarding the propagation time along with the received MIN and the BTS's NIN. BSC 30 and VLR 26 then process the received timing propagation information in conjunction with the known geographic locations of the BTSs to triangulate a precise geographic location for PLU 4.

Further precision may be obtained, such as when mobile unit 6 is in close proximity to PLU 4 but is still unable to identify its precise location, where a mobile unit is also equipped as a tracker. In such cases, the subscriber may request the system to command PLU 4 to come up on a dedicated traffic channel (TCH). BTS 20 then assigns an available traffic channel, informs PLU 4 on the control channel, and commands PLU 4 to shift to tile TCH and transmit at short intervals. This would allow the system to update the PLU 4's position on a frequent basis. A precise position could be obtained by measuring an uplink TCH signal characteristic at additional BTS antennas. At the same time mobile unit 6 could be located in a similar manner as PLU 4, tuned to a different TCH. Preferably BSC 30 would then determine the relative position of the mobile unit 6 to PLU 4, and send a signal to mobile unit 6 in the downlink with directions on how to move in order to arrive at the location of PLU 4.

Figure 4:
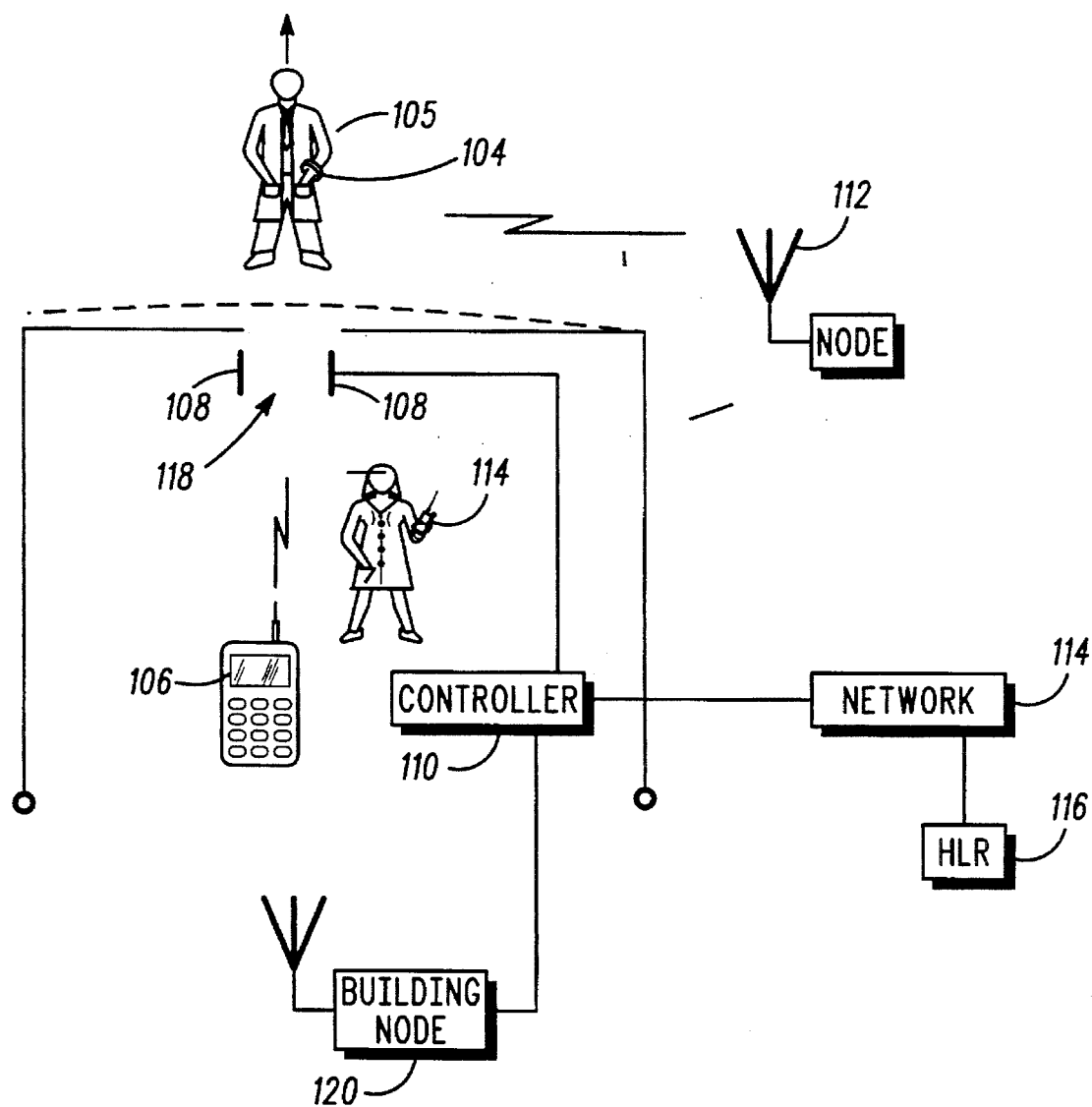
FIG. 4 is a flowchart of yet another embodiment for activating a PLU in accordance with the present invention.

In a further embodiment of the invention, PLU 4 may be activated automatically without waiting for a request from a subscriber. FIG. 4 illustrates four such approaches to automatically activating the PLU. First, some form of boundary detector may be utilized to determine when the person with that attached PLU 104 has exited without authorization. This is particularly appropriate for use in buildings where a limited number of points of egress exist and any person leaving through the exit (118) will pass close by a detector. PLU 104 would, in such cases, preferably be equipped with a low power transponder for responding to continuously emitted signals at detectors 108. If PLU 104 passes by the detectors without first checking out with some system control, or alternatively without passing by the detectors 108 with a person carrying an electronic key 114 coded so as to inhibit any triggering of an alarm or PLU activation command, a boundary detector control unit 110 will then forward the MIN and a protocol identifying the unauthorized exit via network 114 to the HLR 116 of PLU 104. If the parameters for PLU 104 in the HLR 116 have been set to activate PLU 104 upon the occurrence of such event, instructions are then forwarded to a local antenna 112 for transmission of an activation command to PLU 104. Detector control 110 would also preferably set off a local alarm upon occurrence of the unauthorized egress.

Alternatively, PLU 104 may be automatically activated by moving outside of a predetermined range from a monitor 106. In this embodiment, PLU 104 periodically monitors the signal strength received from the monitor transmission. If the signal strength drops below a preset level for a predetermined length of time, a warning signal is transmitted to the monitor 106. If the received signal strength remains below the preset level for a further predetermined length of time, PLU 104 is then programmed to automatically register with the closest network node preferably by means of an extended protocol attached to the registration signal. Upon receiving the registration signal, the local location register and BSC are instructed to retain the PLU MIN and location information in a VLR and forward information about the activation to a network register identifying the HLR 116 of PLU 104, which identifies the HLR to the local location register and forwards the activation and location information to the HLR 116.

Because the HLR 116 of PLU 104 will receive the location information without a request for activation, HLR 116 and its local controller will search for instructions on forwarding such information in the PLU 104 parameters stored in HLR 116. For example, the HLR controller (e.g., C/WAP or BSC) could be equipped to automatically dial one or more numbers preset by the subscriber to notify the subscriber of the event, the location and the time. Upon notification, the subscriber can then access location features by use of a PIN, and commence acquisition of PLU 104 by use of the location features described above. In order to protect the limited system resources, however, if no response is received by the subscriber within a preset amount of time the system preferably resets and a command is sent to PLU 104 to deactivate.

PLU 104 can also be provided with an automatic activation feature for unauthorized removals of PLU 104 from its wearer. In this case PLU 104 can be equipped with an electronic lock or similar tamper proof device, so that any tampering or removal automatically activates the registration procedure. Preferably, the registration signal will also include an extended protocol identifying the event as the removal of PLU 104. For such circumstances, the subscriber may desire PLU parameters in instructing automatic notification of emergency personnel (i.e., police) so that an immediate search can be commenced based on the last known position of the wearer (PLU 104) and such other identifying information (e.g., description of the child) stored in the parameters at HLR 116.

Finally, PLU 104 can also be equipped with a manual input (e.g. button 105), by which the wearer can automatically trigger activation. This would allow a kidnapped child to immediately activate the location features before anyone else is even aware of the kidnapping. This is particularly advantageous where the child is still in a building having an in-building service node 120; when the Location Signal, preferably with extended protocol identifying the event, is received at the node 120 the controller 110 may immediately notify building security so all exits (118) can be sealed before the child is even removed from the building.

While the invention has been described above in connection with specific embodiments, those skilled in the art will appreciate that there are many alternatives, modifications and variations thereto in light of the foregoing description. In particular, while the invention has been described in connection with locating lost or abducted children, it is also applicable for the location of adults, pets, and most any object (such as cars, purses, guns, cut timber, etc.). Further, while the subscriber has been described as receiving location information at phone and wireless terminals, a skilled artisan will appreciate that any communication device capable of network access may be used, such as data terminals, interactive cable TVs, etc. Accordingly, the invention is intended to embrace all such alternatives, modifications, variations as fall within the spirit and scope of the following claims.

What is claimed is:

1. A method of locating a portable locator unit (PLU) in a communications system comprising the steps of:
   a) accessing the communications system and requesting location of the PLU to be sent to a receiving device;
   b) sending a signal from the communications system to the PLU;
   c) sending a response, including a PLU identifier, from the PLU;
   d) receiving the response at a first node of the communications system. said first node having a node identifier;
   e) providing location information within the communications system indicative of the location of the PLU based on analysis of the node identifier;
   f) determining a desired format for the location information based on the PLU identifier; and
   g) providing the location information of the PLU in the desired format to the receiving device.

2. The method of claim 1, wherein the step of sending a signal further comprises sending the signal from a second node of the communications system.

3. The method of claim 2, wherein the step of sending a signal further comprises sending an activation message over a control channel to the PLU and said response is sent over the control channel.

4. The method of claim 1, wherein the step of sending a response further comprises measuring a signal quality level of control channel transmissions from plural nodes of the communications system including the first node, and sending the response to the first node when its signal quality level exceeds the signal quality level of the control channel transmissions of the other of the plural nodes.

5. The method of claim 4, wherein the step of sending a response further comprises sending information about the measured control channel transmissions of the first node and at least two of the other plural nodes.

6. The method of claim 5, wherein the step of providing location information further comprises using the signal quality levels of the measured control channel transmissions to locate the PLU.

7. The method of claim 1, wherein the step of providing the location information further comprises dialing a number of the receiving device and forwarding the location information to the receiving device.

8. The method of claim 7, wherein the location information is forwarded to the receiving device in at least one of a audio and a visual communication format.

9. The method of claim 1, wherein the node identifier is associated with the location of the first node.

10. A method of locating a portable locator unit (PLU) in a communications system comprising the steps of:
    a) monitoring by the PLU for a remote activation signal;
    b) receiving the remote activation signal by the PLU;
    c) transmitting a location signal including a PLU identification by the PLU;
    d) receiving the location signal at a first node of the communications system, and forwarding the PLU identification and a first node identification to a location processor in the communication system;
    e) determining PLU location information by the location processor from the PLU identification and node identification;
    f) storing the PLU location information in a location memory; and
    g) providing the location information to an authorized recipient, 11. The method of claim 10, wherein the first node is a cellular base station and step a) further comprises monitoring a control channel of a cellular base station for a remote activation signal comprising a PLU identifying number and a PLU extended protocol activation command.

12. The method of claim 10, further comprising accessing the communications system and requesting location of the PLU to be sent to the authorized recipient a designated receiving device, sending a remote activation signal from the communications system to the PLU and transmitting the location information to the authorized recipient at the designated receiving device.

13. The method of claim 10, wherein steps a) and b) comprise measuring signals from a monitor unit for a remote activation signal consisting of a received signal below a predetermined signal level.

14. The method of claim 10, further comprising monitoring by the PLU for a signal from a detector, transmitting a response by the PLU upon receiving the signal from the detector, and generating an activation signal for transmission to the PLU.

15. The method of claim 14, further comprising disabling monitoring by a remote activation signal in response to a received inhibit signal.

16. The method of claim 10, further comprising:
    determining by the PLU from a signal from a second node that the PLU has moved from a coverage area of the first node into a coverage area of the second node;
    sending a further location signal in response to the determined move;
    receiving the further location signal at the second node and forwarding the PLU identification and a second node identification to the location processor;
    determining a further PLU location information by the location processor from the PLU identification and second node identification;

storing the further PLU location information in the location memory.

17. The method of claim 16, wherein the step of determining a further PLU location is performed at a second location processor coupled to the second node.

18. A method of locating an object bearing a portable locator unit (PLU) in a communications system comprising the steps of:
   a) monitoring by the PLU for an activation signal;
   b) receiving the activation signal by the PLU;
   c) transmitting a location signal including a PLU identification by the PLU;
   d) receiving the location signal at a node of the communication system, and forwarding the PLU identification and a node identification to a location processor coupled to the node;
   e) determining PLU location information at the location processor from the PLU identification and node identification;
   f) storing the PLU location information in a location memory; and
   g) providing the PLU location information about the PLU's location to an authorized subscriber in communication with the communications system.

19. The method of claim 18, further comprising the step of generating the activation signal by the PLU in response to the removal of the PLU from the object.

20. The method of claim 18, wherein the object is a person, and further comprising the step of generating the activation signal by the PLU in response to a predetermined act by the person.

21. A method of locating a portable device in a communications network comprising the steps of:
   a) sending a node identification signal from each of a plural nodes of the communications network;
   b) receiving at least one node identification signal at the device and determining a node coverage area corresponding to a first of the plural nodes in which the portable device is located from the received at least one node identification signal;
   c) determining by the device, from a second node identification signal, when the device moves into a second node coverage area, and sending a registration signal, including a device identification in response to the determined change in coverage area;
   d) receiving the registration signal at the second node, and forwarding the device identification and a node identification to a network location processor; and
   e) determining a current location of the device from the device identification and node identification of the second node; and
   f) storing the location information indicative of the determined current location in a location register.

22. The method of claim 21, wherein step e) further comprises forwarding the location information to an authorized user.

23. The method of claim 21, further comprising:
   g) determining the location of an authorized user requesting the location information, determining the relative position of the current location of the portable device from the location of the authorized user, and providing the determined relative position to the authorized user.

24. The method of claim 21, wherein the step of sending the registration signal further comprises:
   sending a return echo of the second node identification following a predetermined delay from receipt of the second node identification; and
   receiving the registration signal further comprising measuring the return echo signal to determine distance information of the device from an antenna of the second node receiving the registration signal and forwarding the determined distance information along with the device identification and the node identification of the second node.

25. The method of claim 24, wherein the antenna is a sector antenna having a known coverage region, and the step of receiving the registration signal further comprises forwarding information indicative of the known coverage region of the sector antenna.

26. The method of claim 21, further comprising the steps of:
   sending a channel assignment signal to the portable device;
   receiving the channel assignment signal and transmitting a periodic location signal by the device on the assigned channel;
   measuring a predetermined characteristic of the channel assignment signal by the second node and by a plurality of neighboring nodes;
   forwarding the characteristic measurement and node identification from each node along with the device identification to a location processor; and
   determining the location of the portable device by determining the location of each node from the node identification of each node and comparing the characteristic measurement measured at each node.

27. The method of claim 26, further comprising the step of:
   determining the location of an authorized user requesting the location information, determining the relative position of the current location of the portable device from the location of the authorized user, and providing the determined relative position to the authorized user.

28. A communications system for locating a portable locator unit (PLU) and informing a subscriber of the location, comprising:
   means for accessing the communications system and requesting location of the PLU to be sent to a receiving device;
   means for sending a signal from the communications system to the PLU;
   means for sending a response, including a PLU identifier, from the PLU;
   means for receiving the response at a first node of the communications system, said first node having a node identifier;
   means for providing location information within the communication system indicative of the location of the PLU based on analysis of the node identifier;
   means for determining a desired format for the location information based on the PLU identifier; and
   means for providing the location information of the PLU in the desired format to the receiving device.

29. The system of claim 28, wherein the means for sending a signal is operable for sending an activation signal from a second node of the communications system.

30. The system of claim 29, wherein the means for sending a signal is further operable for sending a paging signal to the PLU including an activation command.

31. The system of claim 28, wherein the means for sending a signal is operable for sending a registration signal from the first node.

32. The system of claim 28, wherein the means of sending a response is operable for measuring signal strength of control channel transmissions from plural nodes of the communications system including the first node, and sending the response to the first node when its measured signal strength is greater than the measured signal strength of the other of the plural nodes.

33. The system of claim 32, wherein the means for sending a response is further operable for sending information about the measured control channel transmissions of the first node and at least two of the other plural nodes.

34. The system of claim 32, wherein the means for sending a response is further operable for sending the response to the first node after a predetermined delay, and for sending second and third responses to second and third node control channel transmissions after a same predetermined delay.

35. The system of claim 34, wherein the means for receiving is further operable for receiving the second and third responses and the means for determining the location is further operable for using the response and second and third responses to locate the PLU.

36. The system of claim 28, wherein the means for providing the location is further operable for dialing a number of the receiving device and forwarding the location information to the receiving device.

37. A communications system for locating a person bearing a locator unit via a communications channel using a wireless link to the locator unit, and for forwarding the location to a subscriber unit, comprising:

- a home location memory having stored locator unit subscriber information and location information about the locator unit;
- a first wireless communication node serving a first coverage area in which the locator unit is located and operable for receiving a location signal from the locator unit;
- a first node location determining processor coupled to the first node and operable for determining the location of the locator unit from the location signal received at the first node, and transmitting further location information about the locator unit; and
- a subscriber call processor coupled to the first node location determining processor operable for receiving the transmitted further location information, and coupled to the home location memory operable for updating location information based on the further location information and generating a subscribed call, based on the stored locator unit subscriber information, containing the further location information.

38. A communications system for locating a person bearing a locator unit via a communications channel using a wireless link to the locator unit, and for forwarding the location to a subscriber unit, comprising:

- a first wireless communication node serving a first coverage area in which the locator unit is located and operable for receiving a location signal from the locator unit;
- a home location memory having stored locator unit subscriber information and location information about the locator unit;
- a subscriber request processor coupled to the home location memory and operable for processing a subscriber location request about the location of the locator unit and transmitting a further location request including the locator unit identifier information to the first wireless communication node;
- a first node location request processor coupled to the first node and operable for receiving the further location request and controlling the first node to send a location activation signal to and receive the location signal from the locator unit;
- a first node location determining processor coupled to the first node and operable for determining the location of the locator unit from the location signal received at the first node, and transmitting further location information about the locator unit; and
- a subscriber call processor coupled to the first node location determining processor operable for receiving the transmitted further location information, and coupled to the home location memory operable for updating the location information, based on the further location information, and generating a subscriber call, based on the stored locator unit subscriber information, containing the further location information.

* * * * *

UNITED STATES PATENT AND TRADEMARK OFFICE
CERTIFICATE OF CORRECTION

PATENT NO. : 5,485,163
DATED : Jan. 16, 1996
INVENTOR(S) : Singer, et al.

It is certified that error appears in the above-indentified patent and that said Letters Patent is hereby corrected as shown below:

Column 7, line 41 reads "system." should be --system,--.
Column 8, line 38 reads "recipient a" should be --recipient at a--.
Column 8, line 41 reads "PLU and" should be --PLU, and--.
Column 8, line 53 reads "monitoring by" should be --monitoring for--.
Column 12, line 3 reads "subscribed" should be s--subscriber--.

Signed and Sealed this

Twenty-first Day of May, 1996

Attest:

BRUCE LEHMAN

Attesting Officer     Commissioner of Patents and Trademarks